US006697508B2

(12) United States Patent
Nelson

(10) Patent No.: US 6,697,508 B2
(45) Date of Patent: Feb. 24, 2004

(54) TOMOGRAPHIC RECONSTRUCTION OF SMALL OBJECTS USING A PRIORI KNOWLEDGE

(75) Inventor: Alan C. Nelson, Gig Harbor, WA (US)

(73) Assignee: VisionGate, Inc., Gig Harbor, WA (US)

( * ) Notice: Subject to any disclaimer, the term of this patent is extended or adjusted under 35 U.S.C. 154(b) by 90 days.

(21) Appl. No.: 10/143,064

(22) Filed: May 10, 2002

(65) Prior Publication Data

US 2003/0210814 A1 Nov. 13, 2003

(51) Int. Cl.[7] ................................................. G06K 9/00
(52) U.S. Cl. ........................... 382/131; 382/255; 378/4
(58) Field of Search ................................. 382/128–134, 382/154, 255, 108, 209, 216; 378/4–15, 21–27, 204–206, 41, 98.8–98.12; 348/295, 42, 45, 65, 67; 702/35; 435/6, 7.2; 600/410–430; 359/371, 212; 204/452, 603; 356/340, 318, 326, 73, 39, 72; 250/201.3, 461.2, 459.1

(56) References Cited

U.S. PATENT DOCUMENTS

| | | | |
|---|---|---|---|
| 3,470,373 A | 9/1969 | Brewer | 250/461.2 |
| 3,497,690 A | 2/1970 | Wheeless, Jr. | 250/461.2 |
| 3,657,537 A | 4/1972 | Wheeless, Jr. | 250/461.2 |
| 3,833,762 A | 9/1974 | Gudmundsen | 356/340 |
| 3,960,449 A | 6/1976 | Carleton | |
| 3,999,047 A | 12/1976 | Green | 382/134 |
| 4,175,860 A | 11/1979 | Bacus | 356/39 |
| 4,293,221 A | 10/1981 | Kay | 356/318 |
| 4,360,885 A | 11/1982 | Edgar | 382/131 |
| 4,873,653 A | 10/1989 | Grosskopf | 359/371 |
| 5,141,609 A | 8/1992 | Sweedler et al. | 204/452 |
| 5,148,502 A | 9/1992 | Tsujiuchi et al. | 382/255 |
| 5,281,517 A | 1/1994 | Bacus et al. | 435/6 |
| 5,308,990 A | 5/1994 | Takahashi et al. | 250/459.1 |
| 5,312,535 A | 5/1994 | Waska et al. | 204/603 |

(List continued on next page.)

OTHER PUBLICATIONS

Kikuchi, S. et al., "Three–dimensional computed tomography for optical microscopes," Optics Communications 107 (1994) 432–444.

Kikuchi, S. et al., "Three–dimensional microscopic computed tomography based on general Radon transform for optical imaging systems," Optics Communications 123 (1996).

Matula, P. et al. "Precise 3D image alignment in micro–axial tomography," Journal of Microscopy, vol. 209, Pt. 2 (Feb. 2003) pp. 126–142.

Shapiro, HM, *Practical Flow Cytometry*, 3rd ed., Wiley–Liss, 1995.

Gilbert, P, "Iterative Methods for the Three dimensional Reconstruction of an Object from Projections," Journal of Theoretical Biology 36:105–17, 1972.

(List continued on next page.)

*Primary Examiner*—Leo Boudreau
*Assistant Examiner*—Ishrat Sherali
(74) *Attorney, Agent, or Firm*—George A. Leone

(57) ABSTRACT

Three-dimensional (3D) reconstruction of a cell includes adjusting a current set of projection images according to a priori knowledge to produce adjusted projection images, for example, based on probability masks and/or Bayesian analysis of multiple similar objects in the same sample. A reconstruction algorithm processes the adjusted projection images to generate a 3D image. The 3D image is further adjusted according to the a priori knowledge to generate an adjusted 3D image. Criteria for process completion are applied to determine whether the adjusted 3D image is adequate. Otherwise, a set of pseudo projections are computationally created at the same projection angles as the current set of projection images and then compared to the current set of projection images to produce a set of new projections, wherein the new projections are input again to the reconstruction algorithm and the steps of the method are repeated until the adequacy criteria are met.

22 Claims, 4 Drawing Sheets

U.S. PATENT DOCUMENTS

| | | | |
|---|---|---|---|
| 5,402,460 A | 3/1995 | Johnson et al. | 378/10 |
| 5,668,887 A | 9/1997 | Parker et al. | 382/108 |
| 5,680,484 A | 10/1997 | Ohyama et al. | 382/255 |
| 5,741,411 A | 4/1998 | Yeung et al. | 204/452 |
| 5,828,408 A | 10/1998 | Mottin et al. | 348/295 |
| 5,848,123 A | 12/1998 | Strommer | 378/98.8 |
| 5,878,103 A | 3/1999 | Sauer et al. | 378/15 |
| 5,909,476 A | 6/1999 | Cheng et al. | 378/4 |
| 5,987,158 A | 11/1999 | Meyer | 382/133 |
| 6,005,617 A | 12/1999 | Shimamoto et al. | 348/295 |
| 6,026,174 A | 2/2000 | Palcic | 382/133 |
| 6,047,080 A | 4/2000 | Chen et al. | 382/128 |
| 6,130,958 A | 10/2000 | Rohler et al. | 382/131 |
| 6,165,734 A | 12/2000 | Garini | 435/7.21 |
| 6,201,628 B1 | 3/2001 | Basiji | 359/212 |
| 6,211,955 B1 | 4/2001 | Basiji | 356/326 |
| 6,248,988 B1 | 6/2001 | Krantz | 250/201.3 |
| 6,249,341 B1 | 6/2001 | Basiji | 356/73 |
| 6,251,586 B1 | 6/2001 | Mulshine | 435/6 |
| 6,251,615 B1 | 6/2001 | Oberhardt | 435/7.21 |
| 6,252,979 B1 | 6/2001 | Lee | 435/7.21 |
| 2001/0012069 A1 | 8/2001 | Derndinger et al. | 348/295 |
| 2002/0161534 A1 | 10/2002 | Adler et al. | 702/35 |

OTHER PUBLICATIONS

Oppenheim, BE, 'More Accurate Algorithms for Iterative 3 dimensional Reconstruction, IEEE Transactions on Nuclear Science NS–21:72–7, 1974.

Singer, JR, Grunbaum, FA, Kohn, P, and Zubelli, JP, "Image Reconstruction of the Interior of Bodies that Diffuse Radiation," Science 248(4958):990–3, 1990.

Mueller, K and Yage, R, "Rapid 3–D Cone–beam Reconstruction with the Simultaneous Algebraic Reconstruction Technique (SART) Using 2–D Texture Mapping Hardware", IEEE Transactions on Medical imaging 19(12):1227–37, 2001.

Bellman, SH, Bender, R, Gordon, R, and Rowe, JE, "ART is Science being A Defense of Algebraic Reconstruction Techniques for Three dimensional Electron Microscopy," Journal of Theoretical Biology 32:205–16, 1971.

Manglos, SH, Jaszcak, RJ, and Floyd, CE, "Maximum Likelihood Reconstruction for Cone Beam SPECT: Development and Initial Tests," Physics in Medicine and Biology 34(12):1947–57, 1989, #1382.

Manglos, SH, Gagne, GM, Krol A, Thomas, FD, and Narayanaswamy, R, "Transmission Maximum–likelihood Reconstruction with Ordered Subsets for Cone Beam CT", Physics in Medicine and Biology 40(7):1225–41, 1995, #4389.

Hampel, U and Freyer, R, "Fast Image Reconstruction for Optical Absorption Tomography in Media with Radially Symmetric Boundaries", Medical Physics 25 (1):92–101, 1998.

Jiang, H, Paulsen, KD, and Osterberg, UL, "Frequency–domain Near–infrared Photo Diffusion Imaging: Initial Evaluation in Multitarget Tissuelike Phantoms", Medical Physics 25(2):183–93, 1998.

Herman, G, *Image Reconstruction from Projections: The Fundamentals of Computerized Tomography,* Academic Press, New York, 1980.

Paulsen, KD and Jiang, H, "Spatially Varying Optical Property Reconstruction Using a Finite Element Diffusion Equation Approximation", Medical Physics 22(691–701) 1995.

TOMOGRAPHIC RECONSTRUCTION OF SMALL OBJECTS USING A PRIORI KNOWLEDGE

FIELD OF THE INVENTION

The present invention relates to three-dimensional (3D) imaging systems in general, and, more particularly to three-dimensional (3D) imaging systems using a priori knowledge about an object of interest that is undergoing image reconstruction using computed tomography.

BACKGROUND OF THE INVENTION

Image reconstruction algorithms in use today compute the typically three-dimensional (3D) structure of an object from its one or two-dimensional projections without using additional information about the object. Known reconstruction algorithms in the tomography field, and especially the optical tomography field, are deficient in the use of a priori knowledge for enhancing object reconstruction.

SUMMARY OF THE INVENTION

In one embodiment, the present invention provides a method for three-dimensional (3D) reconstruction of an object of interest, such as a cell, including adjusting a current set of projection images according to a priori knowledge to produce adjusted projection images, for example, based on simple probability masks or Bayesian analysis of multiple similar objects in the same sample. A reconstruction algorithm is used on the adjusted projection images to generate a 3D image. The 3D image is further adjusted according to the a priori knowledge to generate an adjusted 3D image. Criteria for process completion are applied to determine whether the adjusted 3D image is adequate. Otherwise, a set of pseudo projections are computationally created at the same projection angles as the current set of projection images and then compared to the current set of projection images to produce a more realistic set of new projections, wherein the new projections are input again to the reconstruction algorithm and the steps of the method are repeated until the adequacy criteria are met.

DETAILED DESCRIPTION OF THE PREFERRED EMBODIMENTS

This invention describes the advantageous use of a priori knowledge about an object of interest that is undergoing image reconstruction using computed tomography. In most cases, there exists certain information about an observed object that can be utilized in the image reconstruction to compute more accurate or more realistic 3D reconstructions. Such a priori knowledge serves to constrain the reconstruction within the bounds of allowable features (i.e., what "can be") and unallowable features (i.e., what "cannot be"). In a noisy image, knowing a set of unallowable features (i.e., what "cannot be") can significantly improve the accuracy, and as an additional consequence, the speed and efficiency, of the computed image reconstruction. The example used to illustrate the principals of image reconstruction using a priori knowledge is the biological cell, but those skilled in the art will recognize that these principals may be applied generally to any object undergoing image reconstruction where certain information concerning the shape and structure of the object is known.

Figure 1:
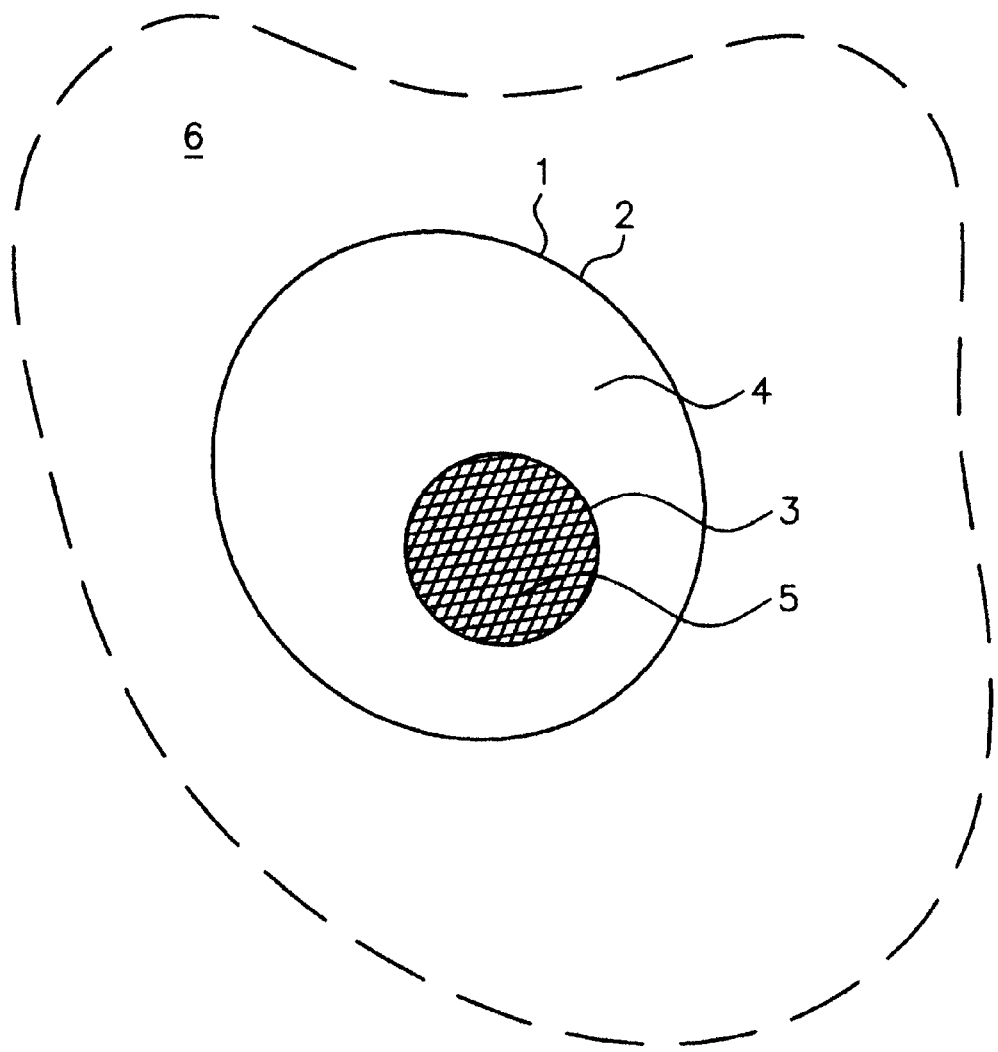
FIG. 1 shows an illustration of an idealized biological cell that may serve as a probability mask and may be improved through Bayesian analysis of similar cells in the sample in accordance with the teachings of the present invention.

Referring now to FIG. 1, there shown is an illustration of an idealized biological cell. There exists certain information in the form of knowledge about a cell 1 that is useful in a reconstruction process as contemplated by one example of the method of the invention. For instance, biologists already know that a typical cell 1 consists of an external bounding membrane 2 (e.g., the cytoplasmic membrane), an internal bounding membrane 3 (e.g., the nuclear membrane), and these two membrane surfaces may typically be smoothly continuous and roughly concentric. The two bounding membranes define three compartments: the nuclear compartment 5 inside the nuclear membrane, the cytoplasmic compartment 4 outside the nuclear membrane but inside the cytoplasmic membrane and the exterior space 6 outside the cytoplasmic membrane. The exterior space 6 has no biological structure unless it is contiguous with another cell.

Additionally, in applying one example of the method of the invention, one may advantageously assume that the two separate membrane surfaces are indeed continuous and that there is no useful information in the exterior space where contrast values in that exterior space might be set to either extreme of the contrast range depending on the nature of the imaging system. In an optical tomography system, the exterior space 6 may be assigned a gray value at either end of the contrast distribution; in practice, exterior space 6 is substantially transparent in the image formation system. This a priori knowledge is useful for improving the reconstructed data set in an imperfect projection data set. The a priori knowledge may typically be in the form of a probability mask that is applied to each projection image and likewise to each subsequent pseudo projection image. For example, the probability mask may be binary as a first simple approximation in the elimination of background noise outside the cytoplasmic membrane and may be warped to optimally fit the projection image.

In operation, a tomographic imaging system designed to reconstruct the 3D picture of a cell from its two-dimensional (2D) projections may use a priori knowledge about the cell in the computed image reconstruction of that cell. One example of such a tomographic system is described, for example, in U.S. application Ser. No. 09/927,151 of Alan C. Nelson, filed Aug. 10, 2001, entitled "APPARATUS AND METHOD FOR IMAGING SMALL OBJECTS IN A FLOW STREAM USING OPTICAL TOMOGRAPHY," (hereinafter called the FOT design), incorporated herein by this reference. In the aforesaid FOT design, cell motion is accomplished in a flow stream, wherein cells in suspension move with constant velocity along the single flow axis of a capillary tube.

Another example of such a tomographic system is described, for example, in U.S. application Ser. No. 10/126, 026 of Alan C. Nelson, filed Apr. 19, 2002, entitled "VARIABLE-MOTION OPTICAL TOMOGRAPHY OF SMALL OBJECTS," (hereinafter called the VOT design), incorporated herein by this reference. In the aforesaid VOT design, cell motion is accomplished in a variable motion system.

Each radial 2D projection of the cell comprises an independent shadowgram through the cell and will contain noise. A priori information about noise in this case typically includes the fact that noise introduces an uncertainty in both the location of a contrast element and the actual density value of that contrast element. A priori information may also include data representative of the fact that, because of noise, certain unallowable features will be present in the projection. In some cases, for example, edges that should be continuous, such as membrane edges, may appear fragmented and discontinuous. There may appear to be structure, due to light scatter and diffraction, in the exterior space where no structure should exist. Within the cell itself, there may appear to be contrast values at either extreme of the contrast range and as such are highly improbable, etc. Unallowable features may be identified using many one-dimensional (1D) and 2D image processing techniques including masking, thresholding, histogramming, mathematical morphology, template matching, adaptive processing, statistical and other methods available to those skilled in the art. Therefore, it is possible to adjust the projection image to better represent allowable features and remove unallowable features before the image is sent to a reconstruction algorithm. Once unallowable features are identified using a priori knowledge, the unallowable features may be removed from the image using standard image processing techniques.

Figure 2:
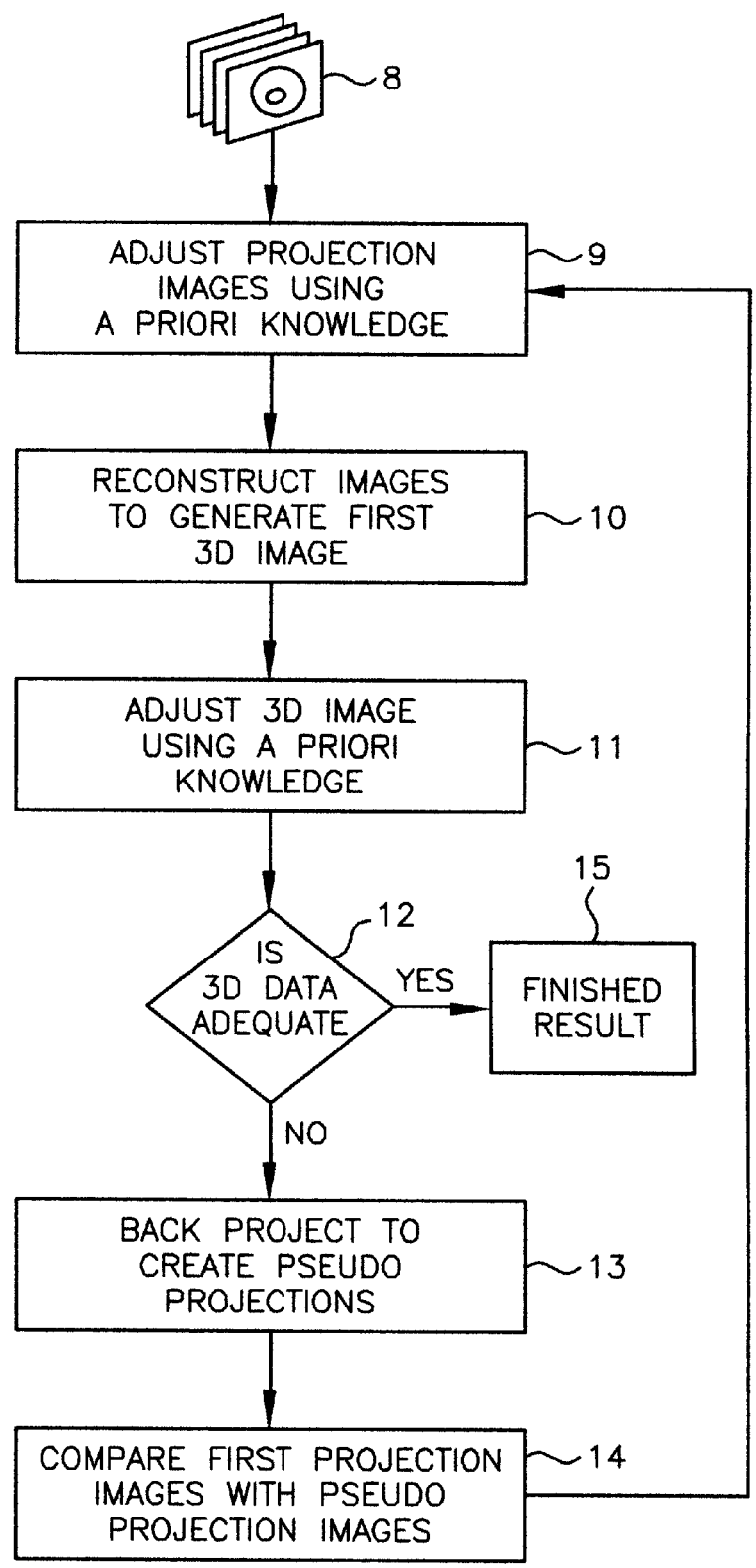
FIG. 2 is an illustration of a flow diagram showing the use of a priori knowledge and iterative processing as contemplated by an embodiment of the present invention.

Referring now to FIG. 2, there shown is an illustration of a flow diagram showing the use of a priori knowledge and iterative processing for generating a 3D image as contemplated by an embodiment of the present invention. Unprocessed projection images 8 are adjusted according to a priori knowledge at step 9, and then input to the reconstruction algorithm to generate the first 3D image at step 10. This in turn is further adjusted by removing unallowable features and conforming the image to allowable features according to a priori knowledge at step 11. Criteria for process completion are applied to determine whether the current reconstruction is adequate at step 12. Criteria for process completion may be any useful imaging related criteria, as, for example, a selected level of confidence values assigned to voxels or pixels as discussed below. Otherwise, a set of pseudo projections is created computationally by generating artificial projections through the 3D data volume at the same projection angles as the current set of projection images, and the current set of projection images is compared to the computed pseudo projection images to produce a more optimal set of new projections at step 14. These new projections are adjusted again to conform with the a priori knowledge then input again to the reconstruction algorithm at step 9 to generate a subsequent 3D image. The process continues until the adequacy criteria are met producing a finished 3D image result at step 15.

Because the input 2D projection images 8 are adjusted at step 9 according to the a priori knowledge before computing the 3D reconstruction at step 10, the 3D reconstructed image will be more realistic and more likely to represent the true structure of the cell as compared to other reconstruction methods. However, once the reconstruction is complete, the 3D image will again contain noise in the form of uncertainty in contrast value and its location. As in the case of the 2D projection images, noise can create the appearance of discontinuities in surfaces that should be continuous and result in assigned contrast values that lie outside the range of probability. Therefore, the reconstructed 3D image may advantageously be further adjusted at step 11 to conform to the a priori knowledge. These adjustments are typically image processing techniques applied in 3D to assess features such as surfaces, volumes and textures. Having adjusted the 3D image, pseudo 2D projections are generated at step 13 at the same projection angles as the original actual projections and the pairs of pseudo versus actual projection images are now compared and adjusted, then re-input to the 3D reconstruction algorithm at step 14. Clearly, steps 9–14 comprise an iterative process that may be repeated through several cycles, but in practice, substantial improvement will be achieved after the second 3D reconstruction using the first 3D reconstruction to generate the first set of pseudo projections which when compared and adjusted against the original actual projections are input to the second 3D reconstruction.

For speed and/or ease of computations a priori knowledge applied to the 2D projection images 8 adjusted at step 9 may comprise a first subset of all available a priori knowledge. Similarly, the a priori knowledge applied to the 3D image may comprise a second subset of all available a priori knowledge. The first and second subsets may comprise some or all of the same a priori knowledge depending upon the application.

Figure 3:
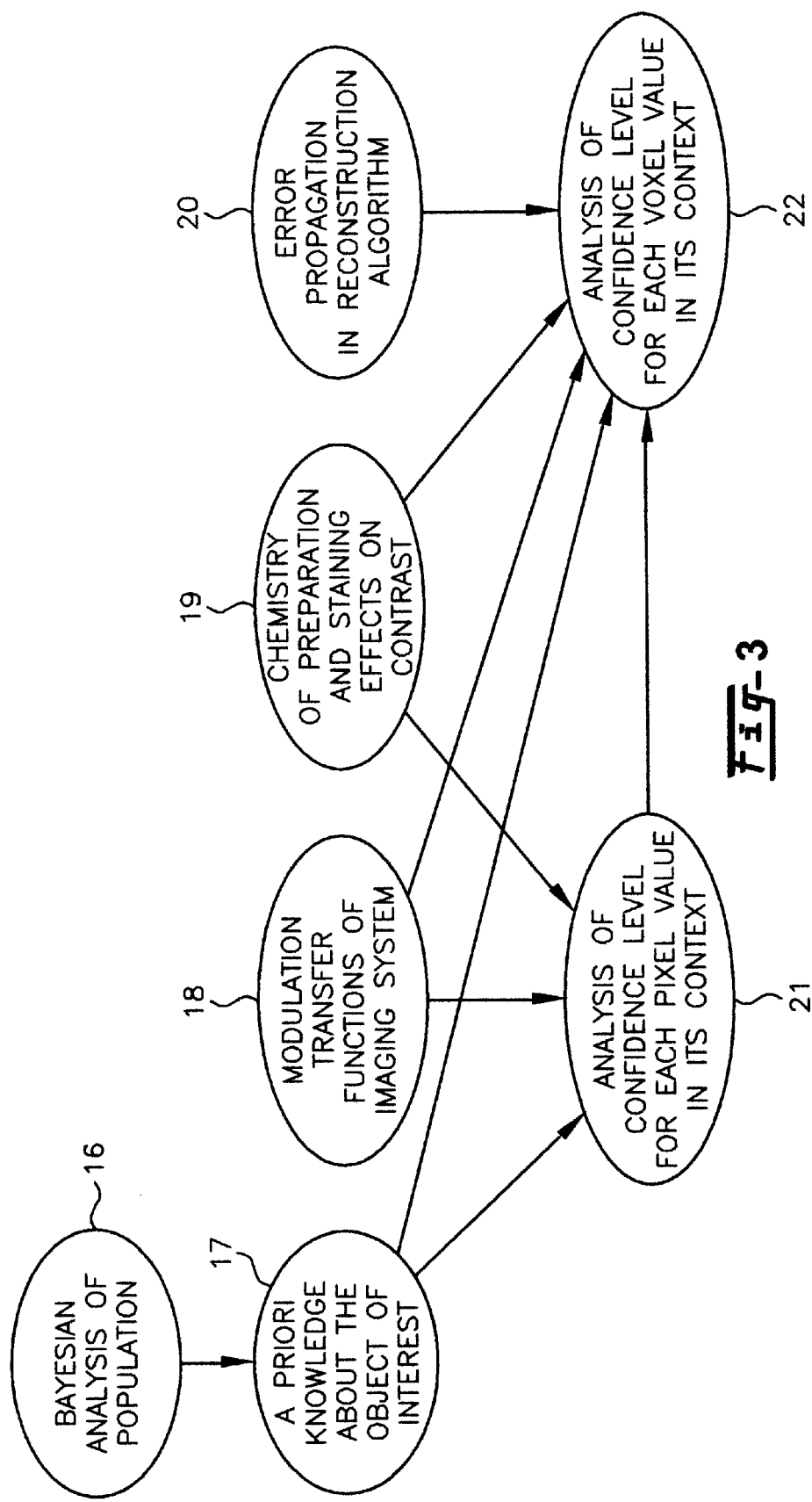
FIG. 3 schematically shows an example of various forms of statistical information that may be utilized in an image reconstruction process to provide a measure of confidence for each voxel in a 3D image as contemplated by an embodiment of the present invention.

Referring now to FIG. 3, there shown are examples of a plurality of forms of statistical information that may advantageously be utilized in an image reconstruction process to provide a measure of confidence for each pixel in a given projection image 21 and each voxel in a 3D reconstructed image 22 as contemplated by an embodiment of the present invention. Because populations of similar types of cells would typically be analyzed in the optical tomography system, Bayesian analysis 16 may be used to improve the a priori knowledge based on the accumulated information in a sample consisting of many similar cells. In addition to the a priori knowledge 17, other sources of statistical variation come from the modulation transfer function (MTF) of the imaging system itself 18, the chemistry of preparing and staining cells 19 and the propagation of errors through the image reconstruction algorithm 20.

Figure 4:
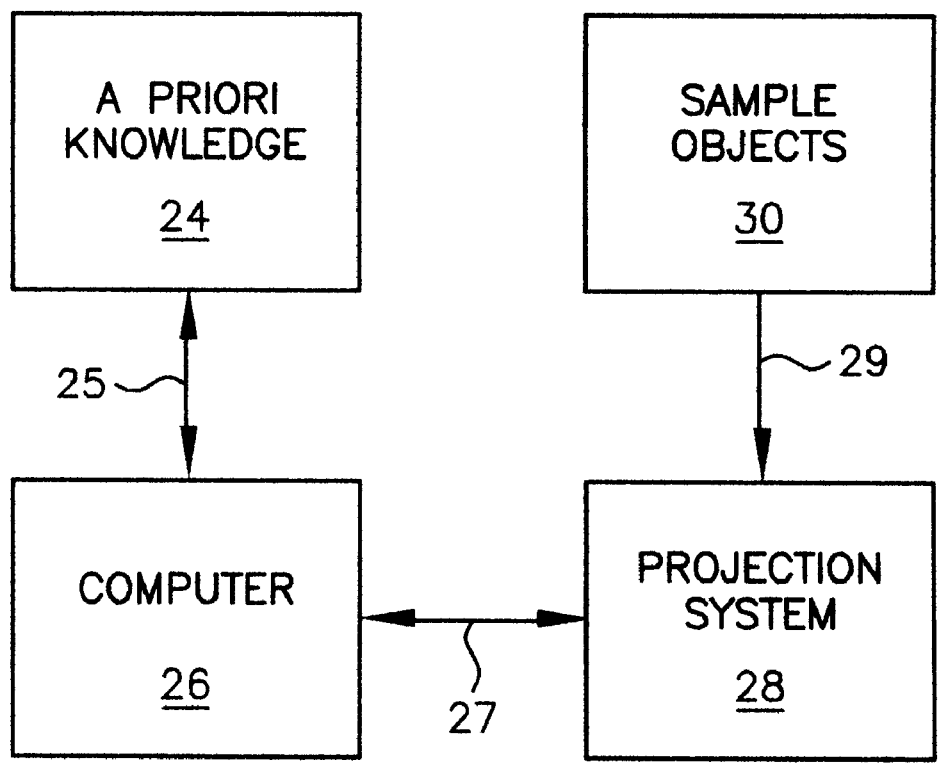
FIG. 4 schematically shows a block diagram of an example of a system for tomographic reconstruction of small objects as contemplated by an embodiment of the present invention.

Referring now to FIG. 4, there shown schematically is a block diagram of an example of a system for tomographic reconstruction of small objects. The system includes a bank of a priori knowledge 24, coupled by a first communication link 25 to a computer 26. The computer 26 is, in turn, coupled by a second communication link 27 to a projection system 28. The projection system 28 receives sample objects 30 through a conventional conduit 29. In one example, the projection system 29 may comprise Nelson's FOT design or VOT design. The bank of a priori knowledge 24 may be stored in any convenient memory format and includes the a priori knowledge discussed above with reference to FIG. 3. The computer 26 may advantageously comprise, for example, software programs for carrying out Bayesian analysis 16, confidence level analysis for each pixel, confidence level analysis for each voxel and image adjustments. The tomographic reconstruction process using a priori knowledge 17 readily lends itself to statistical analysis. The a priori knowledge may advantageously be further adjusted through a Bayesian process 16 whereby the probability of the a priori knowledge approaching truth is improved through the analysis of multiple similar cells from the same sample having been subjected to the 3D tomographic process. Additionally, knowledge of the imaging system modulation transfer functions 18, which may be directly measured using conventional techniques, will set certain expectation distributions in contrast values and spatial localization that are independent of the cell.

As employed in one example embodiment of the invention, a priori knowledge comprises, for example, the chemistry of preparing the cell and using contrast agents 19 that will further result in certain known distributions in contrast. And finally, the 3D image reconstruction algorithm propagates and creates errors in a known and/or testable manner 20. Generally, these probability distributions, except those imposed by the image reconstruction algorithm, will combine multiplicatively into the projection images and provide a means to assess the confidence level of a particular pixel in the context of surrounding pixels. In the end, each pixel in a projection image, and adjustments thereto, are assigned confidence levels with regard to the gray value, location and context 21. Likewise, in the final 3D reconstructed image each voxel is assigned a confidence level with regard to the gray value, location and context 22.

Image Reconstruction

The most common and easily implemented reconstruction algorithms, known as filtered backprojection methods, are derived from a similar paradigm in computerized x-ray tomography (CT) using cone beam and fan beam geometry. (See the following references, for example, Kak, A C and Slaney, M, *Principles of Computerized Tomographic Imaging*, EEE Press, New York, 1988, and Herman, G, *Image Reconstruction from Projections: The Fundamentals of Computerized Tomography*, Academic Press, New York, 1980.) These methods are based on theorems for Radon transforms with modifications that reflect the particular geometry of the source/detector configuration and the ray paths in the irradiating beam. However, in the case of clinical x-ray CT, for slice-by-slice acquisition, the human subject is usually held motionless while the x-ray source and detector arrays may move along an arc around the patient to collect data from multiple projection angles within a given slice. Then the human subject is repositioned along the z-axis and another slice of data is collected, etc. Alternatively, in the more modem clinical helical CT, the patient may be continuously translated in the z-direction while the source-detector assembly rotates continuously to provide helical projection data, which is then interpolated to provide projections orthogonal to the patient z-axis. In flow or variable-motion optical tomography, the subject (a cell) is moved relative to the stationary sources and detector arrays wherein the plurality of source/detector systems acquire data in synchrony with specific gated time points along the cell velocity vector in a fashion that generates multiple projection angle data within a given slice or volume. For slice-by-slice scanning using a fan beam geometry, the reconstruction algorithm will compute a 2D image of a plane perpendicular to the axis of motion, and the serial stacking of multiple slices will generate the 3D picture of the subject where contrast is a function of the variations in the x-ray attenuation coefficient or optical absorption coefficient within the subject for CT or optical tomography, respectively. For volumetric cone beam scanning, the reconstruction algorithm computes a 3D image of a volume within the cell or other object directly from planar transmission or emission optical projections, where the contrast is a function of the optical density and/or tagged probe density distribution, respectively, within the imaged object.

It may be desirable for either the transmission data to produce the cell density reconstruction or for the emission data to reconstruct the labeled probe distribution, or both, to employ image reconstruction algorithms other than filtered backprojection. The general class known as iterative reconstruction algorithms is more efficacious in some instances, especially for emission tomography or when it is possible, as in the instance of the current invention where the axial symmetry and tricompartmental nature of the object are known, to incorporate a priori information into the reconstruction algorithm to improve the quality of the reconstruction (See, for example, Gilbert, P, "Iterative Methods for the Three-dimensional Reconstruction of an Object from Projections," Journal of Theoretical Biology 36:105-17, 1972, and other references noted hereinabove).

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by specifically different equipment, and devices and reconstruction algorithms, and that various modifications, both as to the equipment details and operating procedures, may be accomplished without departing from the true spirit and scope of the present invention.

What is claimed is:

1. A method for tomographic three-dimensional (3D) reconstruction of a sample including at least one object of interest, the method comprising the steps of:

(a) obtaining a current set of projection images from a projection system;

(b) adjusting the current set of projection images of the sample according to a priori knowledge to produce adjusted projection images;

(c) using a reconstruction algorithm on the adjusted projection images to generate a 3D image;

(d) further adjusting the 3D image according to the a priori knowledge to generate an adjusted 3D image;

(e) applying criteria for process completion to determine whether the adjusted 3D image is adequate; and (f) if the adjusted 3D image is not adequate, then computationally creating a set of pseudo projections at the same projection angles as the current set of projection images and comparing the current set of projection images with the pseudo projection images to produce a set of new projections, wherein the new projections are input again at step (a) as a current set of projection images and steps (a) through (e) are repeated until the adequacy criteria are met.

2. The method of claim 1, wherein the at least one object of interest comprises at least one cell.

3. The method of claim 1, wherein the step of adjusting a current set of projection images is based on a probability mask.

4. The method of claim 1, wherein the step of adjusting a current set of projection images is based on Bayesian analysis of multiple similar objects in the sample.

5. The method of claim 1, wherein the a priori knowledge includes a priori knowledge selected from the group consisting of cell preparation chemistry, contrast agents having known distributions in contrast, a measured modulation transfer function of the projection system and errors flowing from a 3D image reconstruction algorithm propagated and created in a known manner.

6. The method of claim 5 wherein the known distributions combine multiplicatively into the current set of projection images to provide a means to assess a confidence level of a particular pixel in the context of surrounding pixels.

7. The method of claim 1, wherein a projection image includes a plurality of pixels, the method further comprising the step of assigning confidence levels based on the gray value, location and context of each pixel.

8. The method of claim 7, wherein an adjusted projection image includes a plurality of adjusted pixels, further comprising the step of assigning confidence levels based on the gray value, location and context of each adjusted pixel.

9. The method of claim 1, wherein the 3D image includes a plurality of voxels, further comprising the step of assigning confidence levels based on the gray value, location and context of each voxel.

10. The method of claim 9, wherein the adjusted 3D image includes a plurality of adjusted voxels, further comprising the step of assigning confidence levels based on the gray value, location and context of each adjusted voxel.

11. A system for tomographic three-dimensional (3D) reconstruction of an object of interest in a sample, comprising:
(a) a projection system for generating a current set of projection images from the sample;
(b) means, coupled to receive the current set of projection images, for adjusting the current set of projection images of the sample according to a priori knowledge to produce adjusted projection images;
(c) means, coupled to receive the adjusted projection images, for using a reconstruction algorithm on the adjusted projection images to generate a 3D image;
(d) means, coupled to receive the 3D image, for further adjusting the 3D image according to the a priori knowledge to generate an adjusted 3D image;
(e) means, coupled to receive the adjusted 3D image, for applying criteria for process completion to determine whether the adjusted 3D image is adequate; and
(f) means, coupled to receive the adjusted 3D image if not adequate, for otherwise computationally creating a set of pseudo projections at the same projection angles as the current set of projection images and comparing the current set of projection images with the pseudo projection images to generate a set of new projections, wherein the new projections are input again to the means for adjusting a current set of projection images as a current set of projection images.

12. The system of claim 11, wherein the object of interest is a cell.

13. The system of claim 11, wherein the means for adjusting a current set of projection images is based on a probability mask.

14. The system of claim 11, wherein the means for adjusting a current set of projection images is based on Bayesian analysis of multiple similar objects in the same sample.

15. The system of claim 11, wherein the a priori knowledge including a priori knowledge selected from the group consisting of cell preparation chemistry knowledge, knowledge of contrast agents having known distributions in contrast, a measured modulation transfer function of the projection system and knowledge of errors flowing from a 3D image reconstruction algorithm propagated and created in a known manner.

16. The system of claim 15 wherein the known distributions combine multiplicatively into the current set of projection images to provide a means to assess the confidence level of a particular pixel in the context of surrounding pixels.

17. The system of claim 11, wherein each projection image includes a plurality of pixels, the system further comprising means for assigning confidence levels based on gray value, location and context of each pixel.

18. The system of claim 17, wherein each adjusted projection image includes a plurality of adjusted pixels, the system further comprising means for assigning confidence levels based on gray value, location and context of each adjusted pixel.

19. The system of claim 17, wherein the 3D image includes a plurality of voxels, the system further comprising means for assigning confidence levels based on gray value, location and context of each voxel.

20. The system of claim 19, wherein the 3D image includes a plurality of adjusted voxels, further comprising means for assigning confidence levels based on the gray value, location and context of each adjusted voxel in a projection image.

21. A method for tomographic three-dimensional (3D) reconstruction from a set of projection images from a sample processed in a projection system including at least one cell, comprising the steps of:
(a) adjusting a current set of projection images of the sample according to a first set of a priori knowledge to produce adjusted projection images, based on Bayesian analysis of multiple similar objects in the sample;
(b) using a reconstruction algorithm on the adjusted projection images to generate a 3D image based on Bayesian analysis of multiple similar objects in the sample;
(c) further adjusting the 3D image according to a second set of a priori knowledge to generate an adjusted 3D image based on Bayesian analysis of multiple similar objects in the sample;
(d) applying criteria for process completion to determine whether the adjusted 3D image is adequate; and
(e) if the adjusted 3D image is not adequate, then computationally creating a set of pseudo projections at the same projection angles as the current set of projection images and comparing the current set of projection images with the pseudo projection images to produce a set of new projections, wherein the new projections are input again to the reconstruction algorithm at step (a) as a current set of projection images and steps (a) through (e) are repeated until the adequacy criteria are met.

22. The method of claim 21, wherein the second set of a priori knowledge includes a priori knowledge selected from the group consisting of cell preparation chemistry, contrast agents having known distributions in contrast, a measured modulation transfer function of the projection system and errors flowing from a 3D image reconstruction algorithm propagated and created in a known manner.

* * * * *